Figure 1:
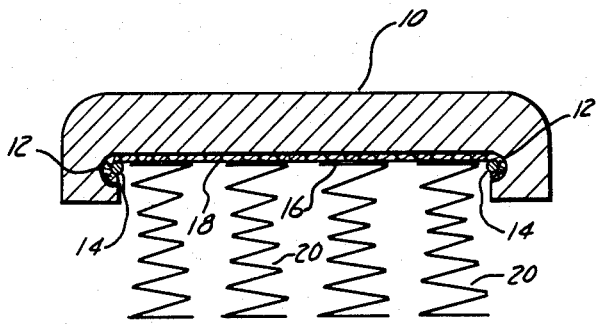

Dec. 31, 1963 S. M. TERRY 3,116,196
COMBINATION PAD AND INSULATOR FOR CUSHIONS
Filed July 16, 1957

INVENTOR
SAMUEL M. TERRY
BY
ATTORNEY

United States Patent Office  3,116,196
Patented Dec. 31, 1963

3,116,196
COMBINATION PAD AND INSULATOR FOR CUSHIONS
Samuel M. Terry, Ann Arbor, Mich., assignor to Stubnitz Greene Corporation, Adrian, Mich., a corporation of Michigan
Filed July 16, 1957, Ser. No. 672,278
1 Claim. (Cl. 161—94)

The present invention relates to improvements in pads particularly adapted for use in the trimming of spring structures of vehicle seats, furniture and the like and the method of making the same.

It has been the practice in the past, in connection with the upholstering of a vehicle seat, for example, to use an insulating strip disposed directly over the top of the spring elements defining the resilient supporting structure of the seat. The function of this insulating strip was to protect the pad material disposed above the spring elements from the abrading action of the spring elements and to distribute the support of the spring elements over the entire area of the pad material and avoid the possibility of the outline of the spring elements being felt by a person sitting upon the upholstered seat. One form of insulating strip of the type just described is shown in Patent No. 2,218,749 in which the strip consists of a suitable fabric, such as burlap, having lengths of reinforcing wire threaded therethrough.

Also, it has been the practice for some time to use pads of molded foam rubber in connection with the upholstery of vehicle seats and the like. More recently such pads have been fabricated from polyester-urethane and polyether-urethane foams. The function of such molded foam pads has been to mask the spring elements and to provide comfort and feel to the upholstered seat or cushion.

According to the present invention it is proposed to substitute for known forms of pad and insulator strips, an improved seat pad construction in which a molded reaction material has associated therewith, as an integral bonded part, an insulator pad or strip. In carrying out the invention, I have provided an improved method whereby the foam material is molded with the insulator pad or strip in place and the foam pad and insulator strip are bonded together as an integral laminated unit.

The insulating strip material to be integrally molded in the pad may be burlap, cotton, linen, felt, jute, paper, sisal or other suitable material in woven or so-called weftless form. The insulator strip may also be formed of string, cord, rope, wire net or screening. Moreover, the insulator strip may comprise chopped fibers such as glass fibers, of different length, roving and the like, blown or otherwise positioned within the mold and then molded into position.

While there is definite advantage from the standpoint of impregnation of the interstices of the insulator strip by the foam material, to use a porous material, it is considered within the scope of the present invention to use, as an insulator strip to be bonded to the foamed material, plastic sheet material and the like, such as vinyl having relatively high resistance to abrasion.

Thus, an object of the invention is to provide a pad for spring structures having a reinforcing surface bonded or otherwise integrally associated and contacting the spring elements.

Another object is to provide a combination foamed pad and insulator strip.

A further object of the invention resides in the method of making a foam pad having an integral insulating strip.

A still further object of the invention is to provide an improved pad for spring structure in the form of a foamed reaction material having an insulator strip disposed along one face thereof with the interstices of the strip impregnated by the reaction material.

These and other objects and advantages of the invention will more fully appear from the following description and the appended claim.

Figure 2:
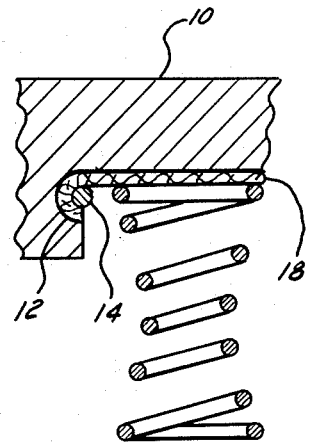
Figure 3:
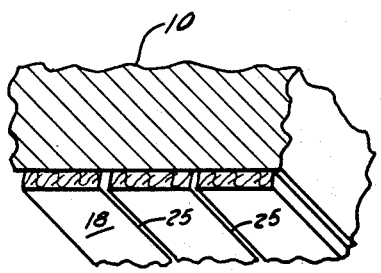
Figure 4:
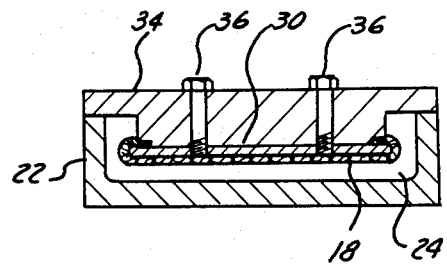
Figure 5:
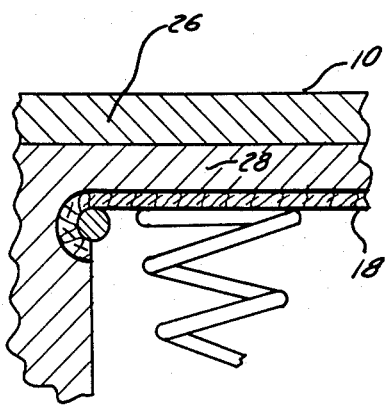

In the drawings,

FIG. 1 is a diagrammatic cross-sectional showing of my improved pad supported upon spring elements, FIG. 2 is an enlarged view of a detail shown in FIG. 1, FIG. 3 is an enlarged fragmentary perspective view of a pad showing the insulator strip of slitted form, FIG. 4 is a diagrammatic sectional view of a mold for carrying out the method of the invention, and FIG. 5 is a fragmentary view similar to FIG. 1 showing a pad of sectional foamed structure.

In the illustrated form of the invention shown in FIGS. 1 and 2, the molded foam pad 10 has a retaining groove 12 adapted to receive the upper border frame 14 of the spring structure 16. Located at the underside of the pad 10 in a position to engage directly with the spring structure 16 is an insulator strip 18 which is suitably bonded or otherwise integrally associated with the surface of the pad 10 which is engaged by the spring elements 20.

In practice, the strip 18 may be of light weight woven burlap or cotton canvas. When the strip 18 is to be molded integrally with the pad 10, the strip 18 may be placed in a suitable mold 22, as shown in FIG. 4. By making the mold 22 in the manner shown, the strip 18 may be clamped in position within the mold and, thereafter, when the reaction material 24 is placed in the mold and the chemical foaming action takes place to fill the mold 22 the reaction material penetrates the interstices of the strip 18 to integrally bond the same to the pad 10 upon curing the material within the mold in a well known manner. Upon removing the pad 10 from the mold, the strip 18 may be severed to provide slits 25.

FIG. 5 shows a pad 10′ having a very soft upper part 26 of foamed material and a lower part 28 of a somewhat more firm foamed material, the latter being bonded to the insulator strip 18′. The upper part 26 may be separately formed and then bonded to the part 28 or it may be foamed and cured on the lower part 28 as a separate operation from the foaming and curing of the lower part 28. It will be understood that any suitable bonding or adhesive material compatible with the foam reaction material may be employed to secure the sections 26 and 28 together or to attach the insulator strip 18 and 18′ in position where they are not integrally bonded by impregnation of foamed material taking place in the mold itself.

The reaction material which is preferably formed and cured in bonding relation to the insulating strip material 18 and 18′ may take several forms depending upon the results desired. Using polyester-urethane foams, for a 25% deflection, a compression resistance in the range of 0.8 to 1.2 pounds per square inch has been obtained. With polyether-urethane foams, for a 25% deflection, a compression resistance in the range of 0.2 to 0.5 pound per square inch has been obtained. To insulate against the feel of the spring structure 16, the polyether type foams permit the use of relatively thin pads. However, the polyester type foams do not provide as soft a "feel" as the softer polyether-urethane foams. However, the polyester type foam pads must be thicker to obtain the same degree of insulation against the spring elements of the spring structure 16. As shown in FIG. 4, by lining the outer surface of the plate 30 of the mold 22 with the insulator material 18 and clamping the plate 30 with the strip 18 extending around the edges of the plate and between the plate and the mold lid 34 through the attachment bolts 36, the strip 18 can be positioned within the mold 22 in such a manner as to line and reinforce the retaining groove 12. Upon expansion of the foam in the mold 22 the interstices of the strip 18 are impregnated by the foam. At the same time the diisocyanate in the expanding foam reacts with the strip 18. Thus, both the chemical reaction and the impregnation has a stiffening action upon the strip 18, making it a more efficient insulating pad. With the side of the pad reinforced by the strip 18 resting upon the spring elements of the spring structure 16, the foam material of the pad 10 is protected against being torn or abraded by the spring elements in use. The pad 10' of sandwich form shown in FIG. 5 may have the upper layer 26 of polyether type foam to provide a soft "show-room" feel to the seat construction of the vehicle and the lower layer 28 may be of polyester type foam which has excellent insulating characteristics even in relatively thin sections. The use of burlap or other insulating fabric to make up the insulating strip 18 reduces the thickness and density requirements of the foam layer or layers of the pad 10 and contributes to the economy of the composite seat construction. It also increases the serviceability of the foam material making up the main body of the pad 10.

An example of a suitable type of polyester foam follows:

| | Parts by weight |
|---|---|
| Resin | 100.0 |
| Emulsifier | 1.0 to 2.0 |
| Catalyst | 0.1 to 2.0 |
| Water | 1.5 to 4.0 |
| Diisocyanate | 20.0 to 55.0 |

In the above example, the resin would be saturated polyester resin having a low acid number, preferably less than 2.0 and a hydroxyl number of 60 plus or minus 15. The emulsifier may be anionic or a mixture of anionic and a non-ionic detergent. The catalyst is a tertiary amine and preferably N-methyl morpholine. The water may be distilled or deionized or mere tap water although preferably it is distilled or deionized. The diisocyanate is an isomeric mixture of 2,4-tolylene diisocyanate and 2,6-tolylene diisocyanate of which the ratio of isomers lies between 65 and 80 parts of the 2,4-isomer to 35 and 20 of the 2,6-isomer. The 80–20 isomeric mixture is preferable wherein the 80 parts is the 2,4-isomer.

A specific formula used in practice and falling within the above example is:

| | Parts by weight |
|---|---|
| Resin | 100.0 |
| Witco 77–86 (a wetting agent in the form of a sulfonated mixture of aliphatic acids and alcohols) | 2.0 |
| N-methyl morpholine | 1.0 |
| Water | 3.0 |
| Hylene TM | 43.0 |

Wherein Hylene TM comprises 80 parts 2,4-tolylene diisocyanate and 20 parts 2,6-tolylene diisocyanate.

The specific formula set forth immediately above may be used in providing the cellular reaction product of the present invention either in a "straight-shot" method or in a prepolymer system. In the "straight-shot" system, the resin and all other ingredients except the diisocyanate are mixed together and this mixture as one component is mixed with a diisocyanate to produce the foam. In the prepolymer system, the diisocyanate and a part of the resin are pre-reacted to form polymer in which all hydroxyl groups in the resin are converted to urethane groups by using a large excess of diisocyanate. Thus, all the functional groups of the prepolymer are isocyanate. This prepolymer is then used as one of the components and the second component consists of additional resin, emulsifier, catalyst and water. For example, the first component may consist of resin 50 parts by weight and diisocyanate 43 parts by weight and the second component may consist of resin 50 parts by weight, emulsifier 2 parts by weight, catalyst one part by weight and water 3 parts by weight. The reaction of the first and second components produces the foam.

An example of a suitable type of polyether-urethane foam follows: The polyether foams involve the prepolymer system only. The usual practice is to combine the resin with an excess of diisocyanate to form the prepolymer. The isocyanate groups which are not reacted in the formation of the prepolymer are free to react with water in producing the foam. In like manner, such free isocyanate groups may react with other materials containing active hydrogen compounds, e.g., burlap, cotton, etc. For example, the block polymer Tetronic 701 which is a condensate of ethylene oxide, propylene oxide and ethylene diamine is cooked with tolylene diisocyanate (80:20 isomer mixture). The resulting resin is converted to a foam by mixing with an emulsifier, catalyst and water. A typical formulation is as follows:

| Prepolymer— | Parts by weight |
|---|---|
| Tetronic 701 | 100.0 |
| Hylene TM | 34.8 |

Cook two hours at 175° F. to form prepolymer.

| Foam formulation— | |
|---|---|
| Prepolymer | 100.0 |
| DC–200 (polymethyl siloxane) (50 centistokes) | 0.5 |
| N-methyl morpholine | 1.0 |
| Triethylamine | 0.2 |
| Water | 2.8 |

The prepolymer may consist of a mixture of polymers including such resins as Pluronics (condensation products of propylene oxide and ethylene oxide), Polypropylene glycol, Teracol (polymeric condensation product of butylene oxide), etc. Usually the mixed polymers are mixed together and then cooked with diisocyanate rather than involving separate cooks with subsequent mixing.

It will be understood that the essence of the present invention is deemed to reside in a pad for spring structures in the form of a cellular reaction product to which has been bonded an insulator strip so as to become an integral laminated part thereof. Preferably the insulator strip is bonded to the cellular reaction product in the mold during the foaming action with the result that the physical characteristics of the insulator strip are improved by the impregnation of the foam material and the chemical reaction taking place between the reaction material and the insulator strip.

In connection with my improved method of forming a laminated cellular reaction product especially designed for use as a pad, it is to be understood that the foam is allowed to expand against the insulating sheet of burlap or other fabric making up the insulator strip and the foam penetrates the porous fabric material becoming mechanically bonded thereto. As a result the fabric is stiffened. In addition, reaction of free diisocyanate in the foaming product with reactive groups in the fibrous material of the fabric (principally hydroxyl groups) bonds the foamed reaction product to the fabric. This reaction results in further stiffening the fabric sheet and converts it into an excellent insulating strip bonded to the resilient cellular pad body and provides excellent high tear and abrasion resistance.

Having thus described my invention what I claim is new and desire to protect by Letters Patent is:

A flexible pad and flexible insulator for spring structure comprising a main body of a cellular reaction product of the group of polyester-urethane and polyether-urethane foams, the surface of said body most adjacent the spring structure with the pad in use having bonded thereto a flexible fibrous insulating material of openwork form to be directly engaged by the spring structure for reinforcing said body and for distributing the support of the spring structure over said body, the bond between said body and said material being that resulting from the foaming of the reaction product prior to curing through said fibrous material, as well as the chemical reaction between the foam and said fibrous material, said fibrous material being of the group of burlap, cotton, jute and sisal.

References Cited in the file of this patent

UNITED STATES PATENTS

| | | |
|---|---|---|
| 1,525,869 | Lakeman | Feb. 10, 1925 |
| 2,198,724 | Schreiner | Apr. 30, 1940 |
| 2,785,440 | Toulmin | Mar. 19, 1957 |

FOREIGN PATENTS

| | | |
|---|---|---|
| 764,330 | Great Britain | Dec. 28, 1956 |
| 842,267 | Germany | Sept. 15, 1952 |